United States Patent [19]
Giles, Jr. et al.

[11] Patent Number: 5,877,241
[45] Date of Patent: Mar. 2, 1999

[54] COATING COMPOSITIONS

[75] Inventors: Frederick Almon Giles, Jr., Charleston; Charles William Glancy, S. Charleston, both of W. Va.

[73] Assignee: Union Carbide Chemicals & Plastics Technology Corporation, Danbury, Conn.

[21] Appl. No.: 873,345

[22] Filed: Apr. 21, 1992

Related U.S. Application Data

[63] Continuation of Ser. No. 540,174, Jun. 19, 1990, abandoned.

[51] Int. Cl.$^6$ ..................................................... C08K 7/16
[52] U.S. Cl. ........................................... 524/104; 524/241
[58] Field of Search ..................................... 524/104, 548, 524/241, 249, 555; 526/263

[56] References Cited

U.S. PATENT DOCUMENTS

| | | |
|---|---|---|
| 3,549,396 | 12/1970 | Dietz . |
| 3,573,081 | 3/1971 | Dietz . |
| 4,474,911 | 10/1984 | Smith et al. ............................. 524/413 |
| 4,695,606 | 9/1987 | Floyd et al. ............................. 525/160 |

FOREIGN PATENT DOCUMENTS 211359 2/1987 European Pat. Off. .

OTHER PUBLICATIONS

Union Carbide Product Information Bulletin UCAR® Reactive Diluent RD 65–2.

*Primary Examiner*—Jeffrey Smith
*Attorney, Agent, or Firm*—W. K. Volles

[57] ABSTRACT

Coating compositions which provide coatings having enhanced properties, e.g., gloss, are disclosed. The coating compositions may be water-borne compositions, or may be water-reducible or water-dispersible compositions including a thermoplastic resin component. Such compositions include a gloss enhancing amount of a nitrogen-containing component selected from compounds having the formula

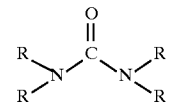

and mixtures thereof, wherein each R is independently selected from the group consisting of H, monovalent hydrocarbyl radicals having 1 to about 4 carbon atoms, and divalent hydrocarbyl radicals having 1 to about 2 carbon atoms,R'OH wherein R' is a divalent hydrocarbyl radical having 1 to about 4 carbon atoms, provided that the compound includes at least one hydroxyl group and if one R is a divalent radical then another R is a bond in the divalent radical or is another divalent radical.

57 Claims, No Drawings

COATING COMPOSITIONS

This application is a continuation of prior U.S. application Ser. No. 07/540,174 filed Jun. 19, 1990 abandoned.

BACKGROUND OF THE INVENTION

The present invention relates to coating compositions having one or more enhanced properties. In particular, this invention relates to water-borne thermoplastic and thermosetting resin coating compositions and to water-reducible or water-dispersible thermoplastic resin coating compositions which provide coatings which have enhanced gloss properties.

Coating compositions, e.g., paints, can be divided into at least four (4) different categories. Thus, the coating composition can be a water-borne thermoplastic resin composition, often called a thermoplastic emulsion. Alternately, the coating composition can be a water-borne thermosetting resin composition, often called a thermosetting emulsion. The third type of coating composition is a water-reducible or water-dispersible thermoplastic resin composition. Finally, the coating composition can be a water-reducible or water-dispersible thermosetting resin composition. These water-reducible or water-dispersible compositions include solvent (other than water)-borne compositions.

These four (4) different types of coating compositions are substantially different from each other, e.g., in composition, and in application utility and procedure. For example, the thermoplastic resins are present substantially in their final form in the coating composition, while the thermosetting resins are not, and often require elevated temperatures to form the final crosslinked or thermoset resin. The thermoplastic and thermosetting emulsions include resins which have very little or no significant water solubility. On the other hand, the water-reducible or water-dispersible compositions include resins which have substantial water solubility.

In many instances with all four (4) types of coating compositions, the gloss of the final coating is an important consideration. High coating gloss, indicative of the reflective nature of the coating, is often desired, e.g., for aesthetic reasons. Thus, it would be advantageous to provide coating compositions which have enhanced gloss properties.

The use of 2-hydroxyethyl ethylene urea as a reactive diluent in water-reducible and water-dispersible thermosetting resin coating compositions is known. Such component acts to effectively increase the weight solids, reduces the viscosity of aqueous industrial baking coatings crosslinked with amino resins, such as melamine/formaldehyde resins, and functions as a cosolvent in the liquid coating, reducing viscosity and solvating polymeric components. During the stoving cure step, 2-hydroxyethyl ethylene urea reacts with the amino resin and becomes part of the coating, and thus reduces the volatile organic compounds (VOC) in the coating composition.

Heretofore, the use of 2-hydroxyethyl ethylene urea has not been recognized as providing gloss enhancement in any coating composition. Moreover, this component has not been used in any coating composition other than water-reducible and water-dispersible thermosetting resin coating compositions, e.g., as discussed above.

SUMMARY OF THE INVENTION

New coating compositions have been discovered. Such coating compositions, in particular water-borne thermoplastic and thermosetting resin coating compositions, and water-reducible or water-dispersible thermoplastic resin coating compositions, have enhanced gloss properties, e.g., enhanced high and/or low angle gloss. In addition, the present coating compositions provide coatings with good film clarity, distinctness of image and sharpness. Further, these compositions advantageously have increased wet edge open time. Such benefits are obtained with little or no substantial detrimental effect on the coating composition itself or on the final coating. For example, the present coating compositions have enhanced gloss properties with substantially no increase in VOC.

In one broad aspect, the present invention is directed to a water-borne coating composition useful for being applied to a surface to obtain a coating on the surface. In another broad aspect, the invention is directed to a water-reducible or water-dispersible coating composition including a thermoplastic resin and being substantially free of crosslinking component. These coating compositions include a nitrogen-containing component, as defined hereinafter, in an amount effective to enhance the gloss of the resulting surface coating, e.g., relative to a substantially identical coating derived form a coating composition without the nitrogen-containing component.

The nitrogen-containing component is selected from compounds having the formula

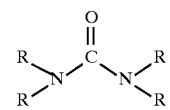

and mixtures thereof. Each R is independently selected from H, monovalent hydrocarbyl radicals having 1 to about 4, preferably 1 to about 3, carbon atoms, divalent hydrocarbyl radicals having 1 to about 2 carbon atom and R'OH wherein R' is a divalent hydrocarbyl radical having 1 to about 4, preferably 1 to about 3, carbon atoms, provided that the compound includes at least one hydroxyl group and if one R is a divalent radical then another R is a bond in this divalent radical or is another divalent radical.

In one particularly useful embodiment, the compound is 1-(2-hydroxyethyl)-2-imidizolidinone, commonly called 2-hydroxyethylethylene urea, hereinafter referred to as HEEU. This compound has the formula

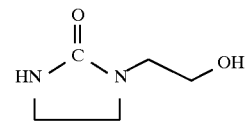

DETAILED DESCRIPTION OF THE INVENTION

The present water-borne coating compositions, and water-reducible or water-dispersible thermoplastic resin coating compositions, are formulated for use, in particular as paints and the like, in coating surfaces. In many instances, these compositions, except for the nitrogen-containing component described herein, may have chemical compositions or make-ups which are conventional and well known in the art. One of the important benefits of the present invention is that little or no formulation modification, other than the inclusion of the presently useful nitrogen-containing component, is often needed to obtain substantial gloss enhancement.

The present coating compositions often include, i.e., are formulated by combining or blending together, a pigment grind component and a letdown component. The pigment grind component includes the pigment component as well as one or more other materials which, for example, facilitate maintaining the pigment component dispersed in the pigment grind component. The letdown component often includes a major amount, i.e., at least about 50% by weight, of the solvents and/or liquid water present in the complete coating composition. Also, one or more other materials are often present in the letdown component, e.g., to provide one or more beneficial properties to the coating composition and/or coating.

The resin component may be present in the pigment grind component and/or in the letdown component. Preferably, at least a portion of the resin component is located in the letdown component. The resin component is preferably present in the coating composition in an amount effective to form a resinous coating on at least a portion of the surface to which the coating composition is applied.

Conventionally, the pigment grind component and the letdown component are combined to form the coating composition. However, it is not necessary that these components be formed, and one or more other components may be included in the present coating composition. In any event, the final, fully formulated coating composition should be such as to be suitable for the desired coating application.

In accordance with the present invention, the water-borne coating compositions, and the water-reducible or water-dispersible thermoplastic resin coating compositions include a nitrogen-containing component, as defined herein, in an amount effective to enhance the gloss of the surface coating derived from applying the composition to a surface. The gloss of this coating is preferably enhanced relative to the gloss of a substantially identical surface coating derived from a coating composition without such nitrogen-containing component. The nitrogen-containing component is selected from compounds having the formula

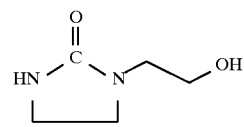

and mixtures thereof, wherein each R is independently selected from the group consisting of H, monovalent hydrocarbyl radicals having 1 to about 4, preferably 1 to about 3, carbon atoms, divalent hydrocarbyl radicals having 1 to about 2 carbon atoms, and R'OH wherein R' is a divalent hydrocarbyl radical having 1 to about 4, preferably 1 to about 3, carbon atoms, provided that the compound includes at least one hydroxyl group and if one R is a divalent radical then another R is a bond in this divalent radical or is another divalent radical.

Among the useful monovalent hydrocarbyl radicals are alkyl radicals and alkenyl radicals, in particular alkyl radicals. Specific examples include methyl, ethyl, propyl, butyl, ethenyl, propenyl and butenyl radicals. Among the useful divalent hydrocarbyl radicals are alkylene radicals. Specific examples include methylene, ethylene, propylene and butylene radicals.

In one embodiment, the presently useful nitrogen-containing component is selected so that each R is selected from H, alkyl, alkylene, and R'OH wherein R' is alkylene, provided that if one R is alkylene then another R is a bond in this alkylene or is another alkylene radical.

One important feature of the presently useful nitrogen-containing component is that it be compatible with the other components of the present coating composition in which it is included. In particular, the nitrogen-containing component is preferably soluble in the liquid material of the coating composition. In this embodiment, the nitrogen-containing component has sufficient solubility, in particular water solubility, to be soluble in the coating composition, in particular in the aqueous liquid material of the coating composition, at normal use conditions of the coating composition.

In order to provide adequate water solubility, the nitrogen-containing component is preferably selected from compounds in which each R has no more than 2 carbon atoms and/or all of the Rs have a total of no more than about 4 carbon atoms. A particularly useful such compound is HEEU, which has the formula

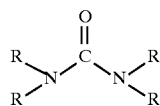

The compound or compounds making up the presently useful nitrogen-containing component can be produced by conventional and well known methods. For example, such compounds can be prepared by reacting an appropriate amine and an appropriate nitrogen compound, such as is described in Deitz U.S. Pat. Nos. 3,549,396 and 3,573,081, each of which is incorporated in its entirety by reference herein.

The nitrogen-containing component may be included in the coating composition as part of the pigment grind component and/or the letdown component and/or may be included separately in the coating composition. Preferably, at least a portion of the nitrogen-containing component is included in the letdown component. Alternately, at least a portion of the nitrogen-containing component may be included in the coating composition independently of the pigment grind component and letdown component.

The amount of the nitrogen-containing component included in the present coating compositions may vary over a wide range. The nitrogen-containing component is preferably present in an amount of at least about 1%, more preferably at least about 2%, by weight of the coating composition. In one embodiment, the nitrogen-containing component is present in an amount of at least about 5%, and preferably at least about 10%, by weight based on the weight of resin component present in the coating composition. In a particularly useful embodiment, the nitrogen-containing component is present in an amount in the range of about 5% to about 70%, preferably about 10% to about 60%, by weight based on the weight of the resin component present in the coating composition. A useful form of the nitrogen-containing component for inclusion in the present coating compositions is as an aqueous solution, preferably including at least a major amount, i.e., at least about 50% by weight, of the nitrogen-containing component.

As noted above, the pigment grind component of the present coating compositions include a pigment component, i.e., one or more pigments. A pigment is and remains substantially insoluble when used in the present coating compositions and surface coatings. The presently useful pigments may be either organic or inorganic pigments. In one embodiment, the pigment component is selected from inorganic pigments, meaning to include therein carbon black and the like, and mixtures thereof. Examples of pigments which can be used and the color which such pigment imparts to the coating composition and surface coating, are as follows:

| | |
|---|---|
| White | Titanium dioxide |
| Black | Lamp Black (Carbon Black) |
| Blue | Phthalo Blue |
| Green | Phthalo Green |
| Umber | Raw Umber |
| Red | Toluidine Red |
| | Red Iron Oxide |
| | Quinacridone Red |
| Yellow | Diarylide Yellow |
| | Yellow Iron Oxide |
| Orange | Dinitranaline Orange |
| Violet | Quinacridone Violet |

In many instances, the coating composition includes titanium dioxide as the primary pigment and one or more other coloring pigments.

The pigment component is preferably present in the present coating compositions as fine particles, more preferably having a particle size of less than about 15 microns, sufficient to provide the uniformity of color desired in the coating composition and surface coating. Such pigments can be conventionally prepared, e.g., by milling, grinding and the like, to provide the desired particle size.

The amount of pigment component present in the coating compositions of the present invention is effective to provide the desired color to the coating composition. Preferably, the pigment component is present in an amount of at least about 1% by weight of the total coating composition, more preferably, at least about 5% by weight of the total composition. In certain instances, the pigment component can be present in any amount in the range of about 10% to about 40% or more by weight of the total coating composition.

As noted above, the resin component may be present in one or both of the pigment grind component and the letdown component. In any event, such resin component is preferably present in the final coating composition in an amount effective to form a resinous coating on at least a portion of the surface to which the coating composition is applied.

Many thermoplastic and thermosetting resins are conventionally used in coating compositions, and such conventionally used resins may be employed in the present coating compositions. Of course, the specific resin or resins employed should be chosen to be appropriate for the coating application involved and should be compatible with the other components of the coating composition. Examples of useful resins include latexes, acrylic resins, vinyl acrylic resins, vinyl acetate resins, alkyd resins, polyester resins, polyurethane resins, epoxy resins, vinyl resins, phenoxy resins and the like. In the event that the final resinous coating is to be a thermoset coating, the resinous component includes an effective amount of a crosslinking component, e.g., at least one crosslinking agent, such as the conventionally used melamine/formaldehyde resins, urea/formaldehyde resins and the like. One or more of such crosslinking agents are employed in combination with one or more other resins, referred to as thermosetting resins, in an amount effective to form crosslinks in the thermosetting resin or resins, e.g., upon the application of heat, to form the final desired thermoset resinous surface coating.

The amount of resin component in the present coating compositions may vary over a wide range and depends, for example, on the specific resin or resins employed, the other components of the coating composition and the coating application for which the coating composition is to be employed. Preferably, the resin component comprises at least about 10%, more preferably at least about 20%, by weight of the coating composition. In one embodiment, the resin component is present in an amount in the range of about 10% to about 70%, preferably about 20% to about 60%, by weight of the coating composition.

The resin component is often introduced into the coating composition in the form of a solution or an emulsion. The solvent or other phase in the emulsion may be aqueous and/or may include other liquids, e.g., such as those noted above and those which are conventionally used in carriers for such resins.

One or more liquid materials are often employed in the present coating compositions. Such liquid material or materials should be compatible with the other components of the coating composition and should be useful in the present compositions, preferably substantially without interfering with the properties of such compositions. Such liquid materials often act as solvents, cosolvents, carriers or vehicles for one or more of the other components of the coating composition. Examples of liquid materials which may be employed are alkoxytriglycols, glycerol, ethylene glycol, propylene glycol, diethylene glycol, alkoxy polyalkylene glycols, polyalkylene glycols, in particular polyethylene glycols having a molecular weight in the range of about 200 to about 600, diethylene glycol monoethyl ether, propylene glycol monopropyl ether, water, mixtures thereof and the like. Liquid water is preferably present in the present coating compositions. The amount and type or types of liquid material or materials present in the coating compositions may vary widely and depends, for example, on the type of coating composition involved and the specific liquid material or materials being employed. As noted above, in many cases little or no reformulation is necessary, e.g., to conventional coating compositions, because of the inclusion of the presently useful nitrogen-containing component. In certain instances, the inclusion of the nitrogen-containing component results in a relatively minor reduction in the amount of water included in order to achieve an optimal coating composition.

The present coating compositions often advantageously include a dispersant component, e.g., at least one surface active agent or surfactant. Such dispersant component is preferably present in an amount effective to facilitate the dispersing of the pigment component, and possibly other components, in the coating composition. Suitable dispersant components can be categorized into the following groups: anionic, cationic, amphoteric and non-ionic. Because of their lower cost and higher efficiency in non-acidic systems, anionic dispersants are most commonly used for dispersing inorganic pigments. Such anionic materials are believed to act by imparting a negative charge to the pigment particles. The anionic dispersants reduce pigment re-aggregation and facilitate maintaining the dispersion through the mutually repelling nature of like charges on each pigment particle. Examples of such anionic dispersants include alkyl arylsulfonates sold by ICI Americas, Inc. under the trademark Atlas G-3300, and sodium salts of polymeric carboxylic acids sold by Rohm and Haas Company under the trademark Tamol® 731.

Cationic dispersants are not normally used because most vehicles in which the pigments are placed are anionically dispersed. Combinations of anionic surfactants and cationic surfactants in the same system may cause pigment coagulation.

Amphoteric dispersants can generate cations in acid media and anions in basic media. Soya lecithin is an example of an amphoteric surfactant which may be used in the present compositions.

Non-ionic dispersants do not ionize in solution and are believed to function to move the wetted pigment particles into the body of the liquid vehicle by providing an "insulating" layer which achieves permanent separation of the particles. Such non-ionic dispersants are often referred to as stabilizers. An example of a non-ionic surfactant useful in the present composition is nonylphenol ethoxyolate sold by Union Carbide Chemicals and Plastics Company Inc. under the trademark Tergitol®. Combinations of different types of dispersants are frequently used to advantage. For example, the present compositions may include a mixture of anionic dispersants and non-ionic dispersants.

The amount of dispersant component included, if any, in the present coating compositions is such as to be effective to perform the desired function, e.g., as described herein. The specific amount of dispersant component used depends, for example, on the other components present in the composition, the specific dispersant or dispersants employed and the desired result to be achieved. Preferably, the amount of dispersants included in the present compositions is at least about 0.1% by weight of the total coating composition. This percentage is based upon active dispersant, which is often available in diluted form.

Other components may be present in the present coating compositions. For example, one or more materials may be included which act to extend the pigment component. Such extender component is preferably present in an amount effective to act as a pigment filler. That is, the extender component is present, preferably in the form of fine solid particles, in an amount such that a reduced amount of pigment component is needed to achieve the desired color properties in the present coating compositions. In other words, the extender component cooperates with the pigment component to provide the coating composition with the desired color. Such extender components may also act as flow control agents or as anti-settling additives, or as leveling or flatting agents for the final surface coating.

Examples of useful extender components include alkali metal and alkaline earth metal silicates, aluminates, sulfates, carbonates and mixtures thereof, such as barium sulfate, calcium carbonate, calcium sulfate, calcium silicate, magnesium sulfate and the like.

The amount of extender component, if any, included in the present coating compositions is such as to be effective to perform the desired function, e.g., as described herein. The specific amount of extender component used depends, for example, on the other components present in the composition, the specific extender component employed and the desired result to be achieved.

In addition, the coating compositions of the present invention may include one or more additional components in an amount to provide desired beneficial properties to the compositions. Such additional components may be chosen from components which are conventionally used to provide such beneficial properties to coating compositions. Among these additional components are: solvents, diluents, thinners, wetting agents, pH adjusters, antifoam (defoamer) agents, bactericides, fungicides, mildewcides, crosslinking catalysts, driers, filming aids, flash rust additives, mar aids, freeze-thaw additives, thickeners, flow additives, anti-crater agents, preservatives and the like. Such additional component or components are included in an amount effective to provide the desired property. Such amount may, for example, be substantially similar to the amount of such additional component or components conventionally employed in coating compositions. Of course, such additional component or components should be chosen to be compatible with the other components of the coating composition.

The present coating compositions can be prepared, for example, using conventional techniques for producing the type of coating composition involved. For example, the pigment grind component and letdown component can be prepared separately and then blended together, with mixing, in the desired proportions to achieve the desired coating composition.

Once the present coating composition is prepared, it may be applied to a surface and dried/cured in a manner such as that conventionally employed for the particular type of coating composition and coating application involved.

After drying/curing, the present coating compositions provide surface coatings which have enhanced gloss properties. Importantly, the other properties of the coating compositions and resulting surface coatings remain substantially unaffected or are also enhanced as the result of the nitrogen-containing component in the present coating compositions.

The following non-limiting examples illustrate certain aspects of the present invention.

EXAMPLES 1 TO 5

A base water-borne thermoplastic vinyl acrylic semigloss paint composition was prepared using conventional blending techniques. This composition was as follows

|  | Weight Parts |
|---|---|
| Pigment Grind: | |
| Water | 80.0 |
| Thickener I[1] | 1.5 |
| Propylene glycol | 60.0 |
| Dispersant[2] | 10.2 |
| Antifoaming agent[3] | 2.5 |
| Titanium dioxide[4] | 255.0 |
| Letdown: | |
| Preservative[5] | 3.0 |
| Water | 9.0 |
| Vinyl acrylic resin[6] | 417.0 |
| Surfactant I[7] | 1.0 |
| Water | 100.8 |
| Thickener II[8] | 22.9 |
| Surfactant II[9] | 1.0 |
| Filming aid[10] | 11.5 |
| Antifoaming agent[3] | 2.5 |
| Ammonia | 2.0 |

[1] Sold under the trademark Cellosize ® ER HEC 15000 by Union Carbide Chemicals and Plastics Company Inc.
[2] Sold under the trademark Tamol ® 731 by Rohm & Haas.
[3] Sold under the trademark Colloid 643 by Colloids, Inc.
[4] Sold under the trademark Ti-Pure R-900 by Dupont.
[5] Sold under the trademark Nuosept 95 by Huls America, Inc.
[6] Sold under the trademark UCAR ® 376 by Union Carbide Chemicals and Plastics Company Inc.
[7] Sold under the trademark Triton X114 by Rohm & Haas.
[8] Sold under the trademark UCAR ® SCT-275 by Union Carbide Chemicals and Plastics Company Inc.
[9] Sold under the trademark Triton GR-7M by Rohm & Haas.
[10] Sold under the trademark Texanol by Eastman Chemicals.

Using this base paint composition, a series of paint compositions were prepared including various amounts of HEEU. These compositions included the following additional components

| Composition | Water, weight parts | HEEU[1], weight parts |
|---|---|---|
| 1 | 67.1 | 3.1 (1) |
| 2 | 63.5 | 7.7 (2.5) |

-continued

| Composition | Water, weight parts | HEEU[1], weight parts |
|---|---|---|
| 3 | 56.8 | 15.3 (5) |
| 4 | 43.8 | 30.6 (10) |
| 5 | 31.0 | 45.9 (15) |
| Control | 70 | — |

[1]Weight is based on an aqueous solution containing 75% by weight of HEEU. The number in parenthesis is the weight percent of this HEEU solution based on resin solids.

Each of these paint compositions was tested for gloss. The gloss test involved applying a 4 mil thick wet film of the composition on a standard Laneta chart. The film was allowed to dry in ambient air for two (2) weeks. Using a Gardner gloss meter, the amount of light reflected by the film from beams of light 20° from vertical and 60° from vertical was measured. This test is consistent with ASTM Method D-523-67.

Results of these tests were as follows:

| Composition | Gloss 20° | Ratings 60° |
|---|---|---|
| 1 | 27 | 72 |
| 2 | 26 | 70 |
| 3 | 23 | 69 |
| 4 | 31 | 74 |
| 5 | 35 | 78 |
| Control | 20 | 67 |

[1]The higher the rating, the more light reflection and the more gloss.

These results indicate that the inclusion of HEEU in a water-borne thermoplastic resin paint composition does increase the gloss of the resulting coating film.

EXAMPLES 6 TO 10

The paint compositions in Examples 1 to 5 were additionally tested to determine the relative wet edge open time of each composition. Wet edge open time is indicative of the maximum time after film application that can elapse before the application of additional composition at the edge of the original film will be visually apparent as a separate or different film. This test involved brushing the paint composition onto a one-half section of a standard Laneta chart at nominal brush thickness. A stop watch was started, and at regular time intervals the paint composition was brushed onto the second half section of the standard Laneta chart. The wet edge open time is the maximum length of time in which this second paint application can occur with no visually apparent lap marks.

Results of these tests were as follows:

| Composition | Wet Edge Open Time, min. |
|---|---|
| 1 | 6 |
| 2 | 6 |
| 3 | 6 |
| 4 | 9 |
| 5 | 9 |
| Control | 2 |

These results indicate that the inclusion of HEEU increases the wet edge open time of a water-borne thermoplastic resin paint composition. Such increases are advantageous in that the paint film is more easily "touched-up" so that a substantially uniform coated surface can be achieved.

EXAMPLES 11 TO 15

A premium quality base water-borne thermoplastic acrylic gloss paint composition was prepared using conventional blending techniques. This composition was as follows:

| | Weight Parts |
|---|---|
| Pigment Grind: | |
| Propylene glycol | 75.0 |
| Surfactant I[1] | 10.2 |
| Antifoaming agent[2] | 2.5 |
| Titanium dioxide[3] | 255.0 |
| Letdown: | |
| Water | 20.0 |
| Acrylic resin | 535.0 |
| Antifoaming agent[2] | 2.5 |
| Propylene glycol | 20.0 |
| Filming acid[4] | 23.0 |
| Fungicide[5] | 1.0 |
| Surfactant II[6] | 0.5 |
| Thickener[7] | 63.7 |

[1]Sold under the trademark TAMOL ® SG-1 by Rohm & Haas. Includes about 35% by weight active surfactant.
[2]Sold under the trademark DEEFO 495 by Ultra Adhesives.
[3]Sold under the trademark Ti-Pure 900 by Dupont.
[4]Sold under the trademark UCAR ® IBT by Union Carbide Chemical and Plastics Company Inc.
[5]Sold under the trademark SUPER-AD-IT by Huls America, Inc.
[6]Sold under the trademark Triton GR-7M by Rohm & Haas.
[7]Sold under the trademark OP4400 HEC by Union Carbide Chemicals and Plastics Company Inc. Includes 2.5% by weight of active material.

Using this base paint composition, a series of paint compositions were prepared including various amounts of HEEU. These compositions included the following additional components.

| Composition | Water, weight parts | HEEU[1], weight parts |
|---|---|---|
| 11 | 52.4 | 3.4 (1) |
| 12 | 48.0 | 8.6 (2.5) |
| 13 | 40.8 | 17.1 (5) |
| 14 | 26.4 | 34.2 (10) |
| 15 | 11.9 | 51.4 (15) |
| Control | 55.5 | — |

[1]Weight is based on an aqueous solution containing 75% by weight of HEEU. The number in parenthesis is the weight percent of this HEEU solution based on resin solids.

Each of the paint compositions was tested for gloss as described in Examples 1 to 5.

Results of these tests were as follows:

| | Gloss Ratings[1] | |
|---|---|---|
| Composition | 20° | 60° |
| 11 | 10 | 52 |
| 12 | 14 | 57 |
| 13 | 15 | 59 |
| 14 | 17 | 61 |
| 15 | 19 | 63 |
| Control | 11 | 54 |

[1]The higher the rating, the more light reflection and the more gloss.

These results indicate that the inclusion of HEEU in a water-borne thermoplastic acrylic resin paint composition does increase the gloss of the resulting coating film, particularly at higher HEEU concentrations.

EXAMPLES 16 TO 20

The paint compositions prepared in Examples 11 to 15 were additionally tested, using the procedure outlined in Examples 6 to 10, to determine the relative wet edge open time of each composition.

Results of these tests were as follows:

| Composition | Wet Edge Open Time, min. |
|---|---|
| 11 | 2 |
| 12 | 2 |
| 13 | 4 |
| 14 | 4 |
| 15 | 4 |
| Control | less than 2 |

These results indicate that the inclusion of HEEU increases the wet edge open time of a water-borne thermoplastic acrylic resin paint composition.

EXAMPLES 21 TO 30

A series of water-borne thermosetting latex paint compositions were prepared using conventional blending techniques. Each of these compositions included the following pigment grind:

|  | Weight Parts |
|---|---|
| Propylene glycol | 2.5 |
| Surfactant I[1] | 2.5 |
| Antifoaming agent[2] | 0.5 |
| Surfactant II[3] | 10.0 |
| Water | 60.0 |
| Titanium dioxide[4] | 250.0 |

[1]Sold under the trademark Tergitol ® NP-10 by Union Carbide Chemicals and Plastics Company Inc.
[2]Sold under the trademark Foamaster VF by Diamond Shamrock.
[3]Sold under the trademark TAMOL ® 731 by Rohm & Haas. Includes about 25% by weight active surfactant.
[4]Sold under the trademark Ti-Pure R-900 by Dupont.

The paint compositions were as follows:

Each of these paints was tested for gloss as described in Examples 1 to 5, except that the coatings were oven dried at 350° F. for 5, 10, 15 and 20 minutes.

In addition, each of these paints was tested for pencil hardness by placing a 4 mil wet thick coating of the paint on a cold rolled steel sheet, oven drying the coating, as noted above, and determining the maximum pencil hardness that does not scratch/cut the coating. Pencils of known hardness were shaped to a cylindrical point with a flat tip and were pushed into the coating surface at a 45° angle. This is consistent with NCCA test method D-3359.

Further, these coated steel sheets were subjected to rubbing with an methyl ethyl ketone (MEK)-containing cloth to determine the MEK resistance of the coating.

Results of these tests were as follows:

| Composition | Gloss 20° | Gloss 60° | MEK Resistance | Pencil Hardness |
|---|---|---|---|---|
| \multicolumn{5}{c}{Drying time 5 Minutes} |
| Control I | 14 | 56 | 100+ | B |
| 21 | 32 | 71 | 9 | 3B |
| 22 | 43 | 78 | 6 | 4B |
| 23 | 49 | 82 | 3 | 5B |
| Control II | 23 | 67 | 100+ | 2B |
| 24 | 53 | 85 | 100+ | 2B |
| 25 | 49 | 84 | 54 | 4B |
| 26 | 16 | 41 | 10 | 5B |
| Control III | 10 | 33 | 100+ | 4B |
| 27 | 32 | 50 | 8 | <4B |
| 28 | 48 | 68 | 6 | <4B |
| Control IV | 20 | 60 | 100+ | 2B |
| 29 | 9 | 33 | 7 | <4B |
| 30 | 10 | 34 | 6 | <4B |
| \multicolumn{5}{c}{Drying Time 10 Minutes} |
| Control I | 11 | 54 | 100+ | F |
| 21 | 28 | 72 | 100+ | H |
| 22 | 44 | 80 | 100+ | H |
| 23 | 54 | 84 | 100+ | F |
| Control II | 17 | 62 | 100+ | F |
| 24 | 49 | 85 | 100+ | H |
| 25 | 58 | 91 | 100+ | H |
| 26 | 16 | 57 | 100+ | H |

| Composition, wt. parts | | | | | | | | | | | | | | |
|---|---|---|---|---|---|---|---|---|---|---|---|---|---|---|
|  | Control I | 21 | 22 | 23 | Control II | 24 | 25 | 26 | Control III | 27 | 28 | Control IV | 29 | 30 |
| Pigment grind | 81.4 | 81.4 | 81.4 | 81.4 | 81.4 | 81.4 | 81.4 | 81.4 | 81.4 | 81.4 | 81.4 | 81.4 | 81.4 | 81.4 |
| Antifoaming Agent[1] | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | 37.1 | 29.8 | 20.3 | 10.7 | 30.8 | 21.2 | 11.7 | 2.1 | 56.4 | 18.2 | 8.6 | 47.8 | 9.6 | — |
| Dimethylethanolamine | 1.0 | 1.0 | 1.0 | 1.0 | 1.0 | 1.0 | 1.0 | 1.0 | 1.0 | 1.0 | 1.0 | 1.0 | 1.0 | 1.0 |
| Thermosetting Latex resin[2] | 158.0 | 158.0 | 158.0 | 158.0 | 158.0 | 158.0 | 158.0 | 158.0 | 158.0 | 158.0 | 158.0 | 158.0 | 158.0 | 158.0 |
| Propylene glycol monopropyl ether | 7.9 | 7.9 | 7.9 | 7.9 | 7.9 | 7.9 | 7.9 | 7.9 | 7.9 | 7.9 | 7.9 | 7.9 | 7.9 | 7.9 |
| Melamine resin crosslinker[3] | 8.6 (12) | 8.6 (12) | 8.6 (12) | 8.6 (12) | 17.2 (24) | 17.2 (24) | 17.2 (24) | 17.2 (24) | 8.6 (12) | 8.6 (12) | 8.6 (12) | 17.2 (24) | 17.2 (24) | 17.2 (24) |
| HEEU[4] | — | 9.6 (10) | 19.1 (20) | 28.7 (30) | — | 9.6 (10) | 19.1 (20) | 28.7 (30) | — | 38.2 (40) | 47.8 (50) | — | 38.2 (40) | 47.8 (50) |

[1]Sold under the trademark Foamaster VF by Diamond Shamrock.
[2]Sold under the trademark UCAR ® Vehicle 462 by Union Carbide Chemicals and Plastics Company Inc.
[3]Sold under the trademark Cymel 303 by American Cyanamid. The number in parenthesis is the weight percent of this product based on resin solids.
[4]Weight is based on an aqueous solution containing 75% by weight of HEEU. The number in parenthesis is the weight percent of this HEEU solution based on resin solids.

-continued

| Composition | Gloss 20° | 60° | MEK Resistance | Pencil Hardness |
|---|---|---|---|---|
| Control III | 7 | 29 | 100+ | H |
| 27 | 45 | 78 | 14 | 4B |
| 28 | 49 | 80 | 10 | <4B |
| Control IV | 11 | 47 | 100+ | H |
| 29 | 9 | 34 | 100+ | 3B |
| 30 | 18 | 56 | 93 | <4B |
| Drying Time 15 Minutes | | | | |
| Control I | 12 | 55 | 100+ | 3H |
| 21 | 37 | 77 | 100+ | 3H |
| 22 | 39 | 75 | 100+ | 3H |
| 23 | 53 | 84 | 100+ | 2H |
| Control II | 17 | 62 | 100+ | 3H |
| 24 | 50 | 89 | 100+ | 3H |
| 25 | 59 | 89 | 100+ | 3H |
| 26 | 27 | 58 | 100+ | 2H |
| Control III | 6 | 33 | 100+ | 3H |
| 27 | 53 | 87 | 33 | 2B |
| 28 | 73 | 95 | 13 | <4B |
| Control IV | 10 | 49 | 100+ | 2H |
| 29 | 10 | 39 | 100+ | 2H |
| 30 | 20 | 66 | 100+ | H |
| Drying Time 20 Minutes | | | | |
| Control I | 16 | 58 | 100+ | 3H |
| 21 | 31 | 73 | 100+ | 3H |
| 22 | 38 | 76 | 100+ | 3H |
| 23 | 55 | 84 | 100+ | 2H |
| Control II | 16 | 61 | 100+ | 3H |
| 24 | 55 | 86 | 100+ | 4H |
| 25 | 61 | 93 | 100+ | 3H |
| 26 | 24 | 62 | 100+ | 3H |
| Control IV | 15 | 38 | 100+ | 3H |
| 27 | 56 | 84 | 33 | 2B |
| 28 | 69 | 89 | 14 | <4B |
| 29 | 18 | 53 | 100+ | 2H |
| 30 | 43 | 82 | 100+ | H |

These results indicate that the inclusion of HEEU increases the gloss of water-borne thermosetting resin paints. In addition, the inclusion of HEEU has no substantial detrimental effect on the MEK resistance or pencil hardness of coatings derived from such paints.

EXAMPLES 31 TO 33

A base water-reducible thermoplastic alkyd resin paint composition was prepared using conventional blending techniques. This composition was as follows:

| | Weight Parts |
|---|---|
| Pigment Grind: | |
| Alkyd resin[1] | 285.8 |
| 20% by weight NH$_4$OH in water | 6.0 |
| Water | 71.9 |
| Flow additive[2] | 0.8 |
| Titanium dioxide[3] | 252.1 |
| Letdown: | |
| Cosolvents[4] | 40 |
| 20% by weight NH$_4$OH in water | 4.0 |
| Flow additive[5] | 1.0 |
| Anti-crater agent[6] | 1.4 |

-continued

| | Weight Parts |
|---|---|
| Alkyd resin[1] | 107.1 |
| Water | 260.0 |

[1]Sold under the Trademark Cargill 7451 by Cargill, Inc.
[2]Sold under the trademark Dow Corning No. 14 by Dow Corning.
[3]Sold under the trademark Ti-Pure R-960 by Dupont.
[4]Includes 20 weight parts of ethylene glycol monopropyl ether and 20 weight parts of butanol.
[5]Sold under the trademark Surfanol 104-E by Air Products & Chemicals, Inc.
[6]Sold under the trademark Troy Latex Anti-Crater by Troy.

Using this base paint composition, a series of paint compositions were prepared including various amounts of HEEU. These amounts were as follows:

| Composition | HEEU[1] Weight Parts |
|---|---|
| 31 | 27.1 (10) |
| 32 | 54.2 (20) |
| 33 | 81.3 (30) |
| Control | 0 |

[1]Weight is based on an aqueous solution containing 75% by weight of HEEU. The number in parenthesis is the weight percent of this HEEU solution based on resin solids.

These paints were used to draw down 4 mil wet thick coatings on rolled steel panels (B#37 panels). The coated panels were oven cured (dried) for 10 minutes at 350° F. These coatings were tested for gloss and pencil hardness, using procedures similar to those described elsewhere herein.

Results of these tests were as follows:

| Composition | Gloss 20° | 60° | Pencil Hardness |
|---|---|---|---|
| 31 | 90 | 96 | 4B |
| 32 | 93 | 99 | 4B |
| 33 | 95 | 99 | 3B |
| Control | 90 | 94 | <4B |

These results indicate that the inclusion of HEEU in a water-reducible thermoplastic paint composition provides enhanced gloss and pencil hardness.

While this invention has been described with respect to various specific examples and embodiments, it is to be understood that the invention is not limited thereto and that it can be variously practiced within the scope of the following claims.

We claim:

1. In a water-borne coating composition useful for being applied to a surface to obtain a coating on said surface, the improvement comprising a nitrogen-containing component in an amount effective to enhance the gloss of said coating relative to a substantially identical coating-derived from a coating composition without said nitrogen-containing component, said nitrogen-containing component being selected from the group consisting of compounds having the formula

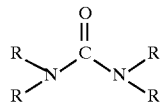

and mixtures thereof wherein each R is independently selected from the group consisting of H, monovalent hydrocarbyl radicals having 1 to about 4 carbon atoms, divalent hydrocarbyl radicals having 1 to about 2 carbon atoms, and R'OH wherein R' is a divalent hydrocarbyl radical having 1 to about 4 carbon atoms, provided that said compound includes at least one hydroxyl group and if one R is a divalent radical then another R is a bond in said divalent radical or is another divalent radical.

2. The water-borne coating composition of claim 1 which includes a thermoplastic resin.

3. The water-borne coating composition of claim 1 which includes a thermosetting resin component.

4. The water-borne coating composition of claim 1 wherein said nitrogen-containing component is present in an amount of at least about 1% by weight.

5. The water-borne coating composition of claim 1 wherein said nitrogen-containing component is present in an amount of at least about 2% by weight.

6. The water-borne coating composition of claim 1 wherein each R is selected from the group consisting of H, alkyl, alkylene and R'OH wherein R' is alkylene, provided that if one R is an alkylene radical then another R is a bond in said alkylene radical or is another alkylene radical.

7. The water-borne coating composition of claim 1 wherein said monovalent hydrocarbyl radicals have 1 to about 3 carbon atoms and said divalent hydrocarbyl radicals have 1 to about 3 carbon atoms.

8. The water-borne coating composition of claim 1 wherein each R has no more than 2 carbon atoms.

9. The water-borne coating composition of claim 1 wherein all of said Rs have a total of no more than about 4 carbon atoms.

10. The water-borne coating composition of claim 1 wherein said nitrogen-containing component has the formula

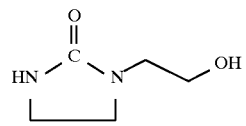

11. The water-borne composition of claim 1 wherein said nitrogen-containing component is present in an amount effective to increase the wet edge open time of said composition.

12. A coating composition comprising:
    a resin component in an amount effective to form a resinous coating on at least a portion of a surface to which said coating composition is applied;
    a pigment component in an amount effective to impart a color to said coating on said surface; and
    a nitrogen-containing component in an amount effective to enhance, relative to a substantially identical resinous coating derived from a composition without said nitrogen-containing component, the gloss of said resinous coating on said surface, said coating composition being a water-borne composition, and said nitrogen-containing component being selected from the group consisting of compounds having the formula

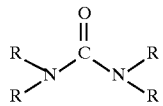

and mixtures thereof, wherein each R is independently selected from the group consisting of H, monovalent hydrocarbyl radicals having 1 to about 4 carbon atoms, and divalent hydrocarbyl radicals having 1 to about 2 carbon atoms, and R'OH wherein R' is a divalent hydrocarbyl radical having 1 to about 4 carbon atoms, provided that said compound includes at least one hydroxyl group and if one R is a divalent radical then another R is a bond in said divalent radical or is another divalent radical.

13. The coating composition of claim 12 wherein said resin component is a thermoplastic resin.

14. The coating composition of claim 12 wherein said resin component comprises a thermosetting resin component.

15. The coating composition of claim 12 wherein said nitrogen-containing component is present in an amount of at least about 5% by weight based on the weight of said resin component.

16. The coating composition of claim 12 wherein said nitrogen-containing component is present in an amount of at least about 10% by weight based on the weight of said resin component.

17. The coating composition of claim 12 wherein each R is selected from the group consisting of H, alkyl, alkylene and R'OH wherein R' is alkylene, provided that if one R is an alkylene radical then another R is a bond in said alkylene radical or is another alkylene radical.

18. The coating composition of claim 12 wherein said monovalent hydrocarbyl radicals have 1 to about 3 carbon atoms and said divalent hydrocarbyl radicals have 1 to about 3 carbon atoms.

19. The coating composition of claim 12 wherein each R has no more than 2 carbon atoms, and all of said Rs have a total of no more than about 4 carbon atoms.

20. The coating composition of claim 12 wherein said nitrogen-containing component has the formula

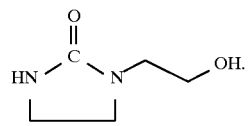

21. In a water-reducible or water-dispersible coating composition, including a thermoplastic resin and being substantially free of crosslinking component, useful for being applied to a surface to obtain a coating on said surface, the improvement comprising a nitrogen-containing component in an amount effective to enhance the gloss of said coating relative to a substantially identical coating derived from a coating composition without said nitrogen-containing component, said nitrogen-containing component being selected from the group consisting of compounds having the formula

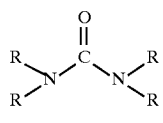

and mixtures thereof, wherein each R is independently selected from the group consisting of H, monovalent hydrocarbyl radicals having 1 to about 4 carbon atoms, divalent hydrocarbyl radicals having 1 to about 2 carbon atoms, and R'OH wherein R' is a divalent hydrocarbyl radical having 1 to about 4 carbon atoms, provided that said compound includes at least one hydroxyl group and if one R is a divalent radical then another R is a bond in said divalent radical or is another divalent radical.

22. The coating composition of claim 21 wherein said nitrogen-containing component compound is present in an amount of at least about 1% by weight.

23. The coating composition of claim 21 wherein said nitrogen-containing component is present in an amount of at least about 2% by weight.

24. The coating composition of claim 21 wherein each R is selected from the group consisting of H, alkyl, and alkylene R'OH wherein R' is alkylene, provided that if one R is an alkylene radical then another R is a bond in said alkylene radical or is another alkylene radical.

25. The coating composition of claim 21 wherein said monovalent hydrocarbyl radicals have 1 to about 3 carbon atoms and said divalent hydrocarbyl radicals have 1 to about 3 carbon atoms.

26. The coating composition of claim 21 wherein each R has no more than 2 carbon atoms.

27. The coating composition of claim 21 wherein all of said Rs have a total of no more than about 4 carbon atoms.

28. The coating composition of claim 21 wherein said nitrogen-containing component has the formula

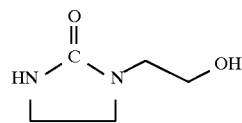

29. A coating composition comprising:
   a thermoplastic resin component in an amount effective to form a resinous coating on at least a portion of a surface to which said coating composition is applied;
   a pigment component in an amount effective to impart a color to said coating on said surface; and
   a nitrogen-containing component in an amount effective to enhance, relative to a substantially identical resinous coating derived from a composition without said compound, the gloss of said resinous coating on said surface, said coating composition being water-reducible or water-dispersible and being substantially free of crosslinking component, said nitrogen-containing component being selected from the group consisting of compounds having the formula

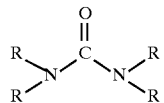

wherein each R is independently selected from the group consisting of H, monovalent hydrocarbyl radicals having 1 to about 4 carbon atoms, divalent hydrocarbyl radicals having 1 to about 2 carbon atoms and R'OH wherein R' is a divalent hydrocarbyl radical having 1 to about 4 carbon atoms, and provided that said compound includes at least one hydroxyl group and if one R is a divalent radical then another R is a bond in said divalent radical or is another divalent radical.

30. The coating composition of claim 29 wherein said nitrogen-containing component is present in an amount of at least about 5% by weight based on the weight of said thermoplastic resin component.

31. The coating composition of claim 29 wherein said nitrogen-containing component is present in an amount of at least about 10% by weight based on the weight of said thermoplastic resin component.

32. The coating composition of claim 29 wherein each R is selected from the group consisting of H, alkyl, alkylene and R'OH wherein R' is alkylene, provided that if one R is an alkylene radical then another R is a bond in said alkylene radical or is another alkylene radical.

33. The coating composition of claim 29 wherein said monovalent hydrocarbyl radicals have 1 to about 3 carbon atoms and said divalent hydrocarbyl radicals have 1 to about 3 carbon atoms.

34. The coating composition of claim 29 wherein each R has no more than 2 carbon atoms, and all of said Rs have a total of no more than about 4 carbon atoms.

35. The coating composition of claim 29 wherein said nitrogen-containing component has the formula

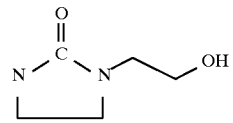

36. A method of enhancing the gloss of a water-borne coating composition, which comprises adding to the coating composition a nitrogen-containing component selected from the group consisting of compounds having the formula

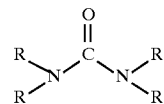

and mixtures thereof wherein each R is independently selected from the group consisting of H, monovalent hydrocarbyl radicals having 1 to about 4 carbon atoms, divalent hydrocarbyl radicals having 1 to about 2 carbon atoms, and R'OH wherein R' is a divalent hydrocarbyl radical having 1 to about 4 carbon atoms, provided that said compound includes at least one hydroxyl group and if one R is a divalent radical then another R is a bond in said divalent radical or is another divalent radical.

37. The method of claim 36, wherein the coating composition includes a thermoplastic resin.

38. The method of claim 36, wherein the coating composition includes a thermosetting resin component.

39. The method of claim 36, wherein the nitrogen-containing component is present in an amount of at least about 1% by weight.

40. The method of claim 36, wherein the nitrogen-containing component is present in an amount of at least about 2% by weight.

41. The method of claim 36, wherein each R is selected from the group consisting of H, alkyl, alkylene and R'OH wherein R' is alkylene, provided that if one R is an alkylene radical then another R is a bond in said alkylene radical or is another alkylene radical.

42. The method of claim 36, wherein said monovalent hydrocarbyl radicals have 1 to about 3 carbon atoms and said divalent hydrocarbyl radicals have 1 to about 3 carbon atoms.

43. The method of claim 36, wherein each R has no more than 2 carbon atoms.

44. The method of claim 36, wherein all of the Rs have a total of no more than about 4 carbon atoms.

45. The method of claim 36, wherein the nitrogen-containing component has the formula

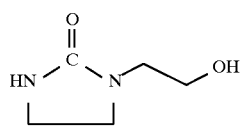

46. The method of claim 36, wherein the nitrogen-containing component is present in an amount effective to increase the wet edge open time of the coating composition.

47. A method of enhancing the gloss of a water-reducible or water-dispersible coating composition that contains a thermoplastic resin and is substantially free of crosslinking component, which comprises adding to the coating composition a nitrogen-containing component selected from the group consisting of compounds having the formula

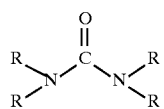

and mixtures thereof wherein each R is independently selected from the group consisting of H, monovalent hydrocarbyl radicals having 1 to about 4 carbon atoms, divalent hydrocarbyl radicals having 1 to about 2 carbon atoms, and R'OH wherein R' is a divalent hydrocarbyl radical having 1 to about 4 carbon atoms, provided that said compound includes at least one hydroxyl group and if one R is a divalent radical then another R is a bond in said divalent radical or is another divalent radical.

48. The method of claim 47, wherein the coating composition includes a thermoplastic resin.

49. The method of claim 47, wherein the coating composition includes a thermosetting resin component.

50. The method of claim 47, wherein the nitrogen-containing component is present in an amount of at least about 1% by weight.

51. The method of claim 47, wherein the nitrogen-containing component is present in an amount of at least about 2% by weight.

52. The method of claim 47, wherein each R is selected from the group consisting of H, alkyl, alkylene and R'OH wherein R' is alkylene, provided that if one R is an alkylene radical then another R is a bond in said alkylene radical or is another alkylene radical.

53. The method of claim 47, wherein said monovalent hydrocarbyl radicals have 1 to about 3 carbon atoms and said divalent hydrocarbyl radicals have 1 to about 3 carbon atoms.

54. The method of claim 47, wherein each R has no more than 2 carbon atoms.

55. The method of claim 47, wherein all of the Rs have a total of no more than about 4 carbon atoms.

56. The method of claim 47, wherein the nitrogen-containing component has the formula

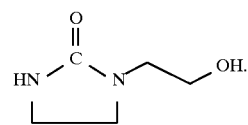

57. The method of claim 47, wherein the nitrogen-containing component is present in an amount effective to increase the wet edge open time of the coating composition.

* * * * *